(12) United States Patent
Yao

(10) Patent No.: US 7,911,479 B2
(45) Date of Patent: Mar. 22, 2011

(54) GAMUT MAPPING

(75) Inventor: Meng Yao, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 758 days.

(21) Appl. No.: 11/943,079

(22) Filed: Nov. 20, 2007

(65) Prior Publication Data

US 2009/0128835 A1 May 21, 2009

(51) Int. Cl.
*G09G 5/02* (2006.01)
(52) U.S. Cl. ........................................ 345/590; 345/602
(58) Field of Classification Search .................. 345/589, 345/590, 591, 602
See application file for complete search history.

(56) References Cited

U.S. PATENT DOCUMENTS

| 6,720,973 | B2 | 4/2004 | Butler |
| 7,251,058 | B2 * | 7/2007 | Pop ................................ 358/1.9 |
| 7,379,208 | B2 * | 5/2008 | Henley et al. ................... 358/1.9 |
| 7,403,205 | B2 * | 7/2008 | Zeng ............................... 345/590 |
| 7,667,873 | B2 * | 2/2010 | Kang et al. ...................... 358/1.9 |
| 7,710,432 | B2 * | 5/2010 | Edge .............................. 345/589 |
| 2004/0056867 | A1 * | 3/2004 | Cui et al. ....................... 345/590 |

* cited by examiner

*Primary Examiner* — Ryan R Yang
(74) *Attorney, Agent, or Firm* — Oliff & Berridge, PLC

(57) ABSTRACT

A mapping technique is disclosed that maps color image data of an image displayed on a first image display device to output color image data for display on a second image display device. This mapping technique maps the color gamut of the first image display device to the color gamut of the second image display device while controlling one or more characteristics of the color image data, and generates one or more lookup tables that correspond to the gamut mapping, for example. The color image data is then mapped to the output color image data based on the lookup tables.

16 Claims, 11 Drawing Sheets

GAMUT MAPPING

BACKGROUND

Digital image display devices are common in our modern world. Each of these image display devices displays an image based on display device characteristics. However, when image data is transferred between two image display devices, the image may be displayed differently on different image display devices.

SUMMARY

A mapping technique is disclosed that maps color image data of an image displayed on a first image display device to output color image data for display on a second image display device. This mapping technique first maps a first gamut of the color image data of the first image display device to a second gamut of the color image data of the second image display device using polygonal and distance ratio mapping. One or more lookup tables are generated based on the gamut mapping. The input color image data may be converted into the output color image data using the lookup tables.

The lookup tables may be generated to control desired properties between the color image data and the output color image data. For example, it may be desirable to control the luminance of the output color image data with respect to the color image data. In this case, the mapping technique may select an objective color space such as CIE L*a*b* (Lab) space and transform color spaces for the first and second devices into Lab space as first and second gamuts based on characteristics of these devices captured in first and second device profiles, for example. In Lab space, the luminance of the second image data may be controlled while mapping the first gamut into the second gamut.

The lookup tables may incorporate some or all of the mappings. If one lookup table is generated, then the color image data may be mapped to the output color image data directly, using a single lookup table. If more than one lookup tables are generated, then the mapping may be performed in stages by different devices such as the first and second devices or a server between the first and second devices.

The one or more lookup tables may be stored in any of the devices or be generated as needed. For example, the first device may include a lookup table to transform the color image data into Lab space, and the second device may transform the color image data in Lab space into CMYK space for printing. In this case, the first devices stores a first lookup table and the second device stores a second lookup table. If a single lookup table is used, any of the devices may store this lookup table and map the color image data to the output color image data. Alternatively, the lookup table may not be stored anywhere, but generated on-the-fly by any of the devices as the need for mapping arises.

After the color image data is generated in the first device, the first device operating system may automatically map the color image data to the output color image data for the second device upon a command to transfer the color image data to the second device. The operating system may have access to the device profiles of the respective devices, and may be able to generate the lookup table or its equivalents immediately after receiving a user command, i.e., on-the-fly, and map the first image data to the second image data before performing the transfer function. This mapping process may also be automatically performed by the second device or by a server between the two devices. In this way, image data may be transferred to and displayed between devices with consistent and desirable results.

DETAILED DESCRIPTION OF EMBODIMENTS

Figure 1:
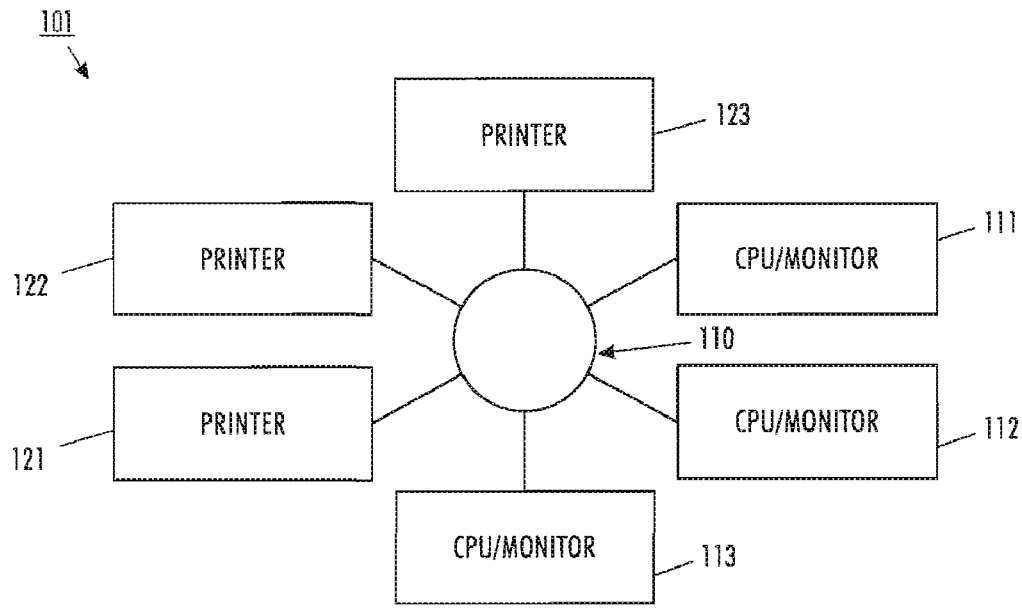
FIG. 1 shows an exemplary block diagram of a network of image processing systems.

FIG. 1 shows an exemplary network of image processing systems 101 that includes network 110, CPU/monitors 111-113, and printers 121-123. Network 110 may be one or more wired, wireless, optical networks, etc. that may be part of a computer network, a LAN, any connection between two or more devices, or a connection between two or more portions of a single device, for example. While FIG. 1 shows only CPU/monitors and printers, other devices may be included, such as scanners, fax machines, projectors, multi-function devices, etc., for example. Additionally, printers 121-123 may be inkjet printers, laser printers, xerographic devices, or any other device capable of printing color image data, for example. The CPU/monitors 111-113 may generate and display image data on monitors and printers 121-123 may print out the color image data.

For example, a user at CPU/monitor 112 may create an image using a graphical interface (GUI). CPU/monitor 112 may respond by generating RGB (red, green, blue) image data (hereinafter RGB) expressed in RGB color space to display the image on its monitor. When satisfied with the image displayed on the monitor, the user may want a hard copy by printing the image using printer 121, for example.

If the RGB image data is received, printer 121 may not be capable of commanding its print head using the RGB image data directly. For example, printer 121 may have 4 ink or toner colors (cyan (C), magenta (M), yellow (Y) and black (K)) and may command the print head only based on CMYK image data expressed in CMYK color space. Thus, printer 121 may first convert the RGB image data to CMYK image data, or receive CMYK image data that was earlier converted before the image can be printed.

This conversion may be complex due to different device characteristics, CPU/monitor 112 may display colors differently than printer 121. For example, an RGB monitor displays colors in an additive manner, so that to increase an amount of color in an image, more of the particular color is added by increasing its intensity, which results in a brighter image. CMYK printers achieve more color by adding more ink, which is subtractive in nature and makes the image darker. Thus, a conversion between RGB image data and CMYK image data without accounting for the additive, subtractive or other characteristics of the various devices may result in an undesirable output such as a darker printout than the image displayed on a CRT display. Hence, to control the conversion process so that one or more particular qualities of an image may be obtained, an intermediate, objective, color space may be selected that permits control of one or more desired characteristics so that a conversion that adjusts selected qualities may be obtained.

For example, Lab color space expresses colors in terms of luminance and chrominance and may be graphically represented by a vertical axis for luminance (L*) and two horizontal axes for chrominance (a* and b*). A point in Lab space may be represented by three values such as (L*, a*, b*) where "L*" is a luminance value along the L* axis, "a*" is a chrominance value along the a* axis and "b*" is a chrominance value along the b* axis. Once converted into Lab color space, the luminance portion of the conversion may be controlled to yield CMYK image data whose corresponding printout of printer 121 is more desirable, for example. Other color spaces may be selected such as Luv, Lch, Jab, etc. Depending on a characteristic of interest, an appropriate color space may be selected for proper control and optimization. For purposes of discussion, Lab color space is selected and image data luminance is controlled when displaying an RGB image data using a CMYK printer, as an example.

The RGB image data generated by CPU/monitor 112 may be converted into CMYK image data for printer 121 by first converting the RGB image data to Lab image data, and then the Lab image data converted into CMYK image data. However, a more generalized technique may be to construct a lookup table that incorporates a mapping of the RGB color space for CPU/monitor 112 to the CMYK color space for printer 121. In this way, any RGB image data generated by CPU/monitor 112 may be converted to CMYK image data for printer 121 by using the lookup table.

Figure 2:
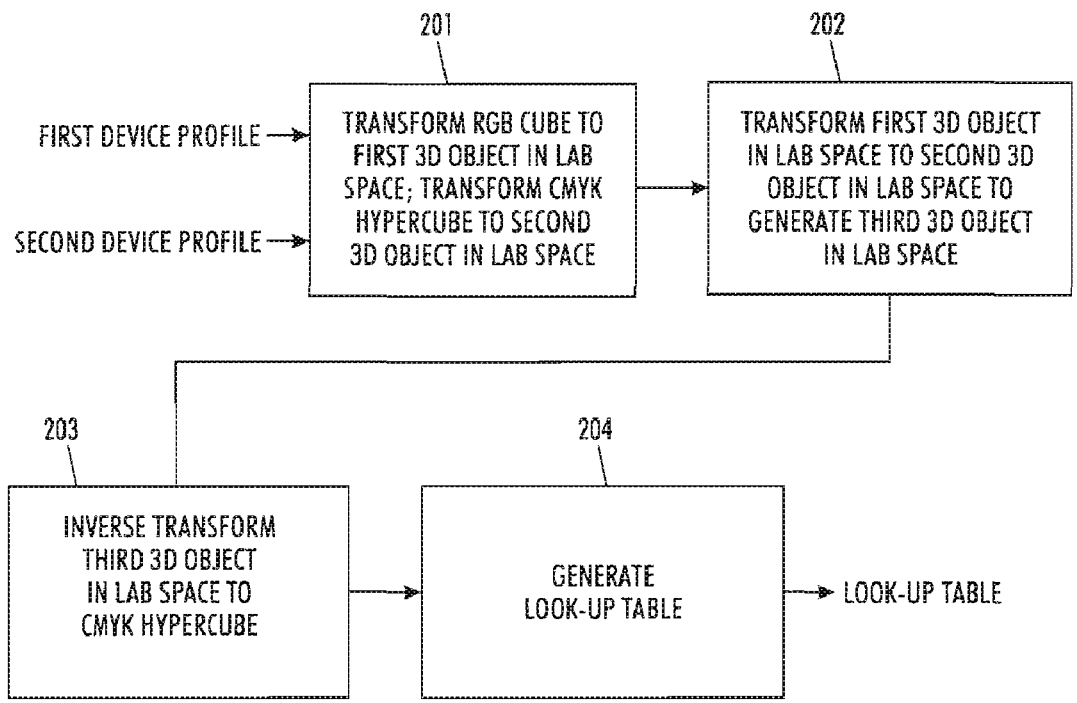
FIG. 2 shows an exemplary process flow diagram for generating a lookup table.

The lookup table may be generated by a process shown in FIG. 2. In block 201, a first device profile for a device such as CPU/monitor 112 may be used to transform the RGB color space for CPU/monitor 112 into a first 3D object in Lab space, corresponding to a first gamut. RGB may be converted to XYZ first using power functions and matrix multiplication, or through a lookup table, and XYZ is then converted to Lab using formulae, for example. In the case of using a lookup table, if an RGB data point that is to be converted to an Lab data point is not included in the device profile, interpolation may be performed among data points in the first device profile to obtain the Lab data point that corresponds to the RGB data point. For example, tetrahedral interpolation may be used where the interpolation may derive a data point in Lab space based on 4 close points in RGB space that form a tetrahedron encompassing the RGB data point.

In practice, representing the RGB space spanned by 8 bit by 8 bit by 8 bit coordinates may be memory intensive. Thus, the RGB space of the first device may be sampled to obtain a subspace, such as a 17 by 17 by 17 cube of 4913 samples, for example. These 4913 points may be transformed into the first 3D object. The outer contour of the first 3D object may then be represented by surface triangles formed by outer points in the first gamut, for example.

CPU/monitor 112 may acquire the device profile from memory or an external source. The device profile may contain a mathematical description or a lookup table for conversion between the device space and an objective color space, such as XYZ, which is related to the Lab space through power functions.

Additionally, in block 201, a second device profile for printer 121, for example, may be used to transform the CMYK color space for printer 121 into a second 3D object in Lab space corresponding to a second gamut similar to the first device profile for generating the first gamut. The second device profile may be acquired by printer 121 or CPU/monitor 112, or generated by printing color patches, using a spectrophotometer to measure the patches and determining a correspondence between data points in CMYK space and data points in Lab space.

In block 202, the first 3D object may be mapped into the second 3D object to form a third 3D object so that a correspondence between the data points in RGB space and the data points in CMYK space is established in Lab space. The third 3D object is the result of mapping the first gamut to the second gamut. It may be a subset of the second gamut.

In block 203, the third 3D object may be inverse transformed to the CMYK color space based on the second device profile. The results of all the transformations and mappings establishes a correspondence between data points in the RGB color space and the CMYK color space. Interpolation may be used to convert Lab data points in the third 3D object to CMYK data using the Lab data point and four close Lab data points that form a tetrahedron encompassing the Lab data point.

Figure 3:
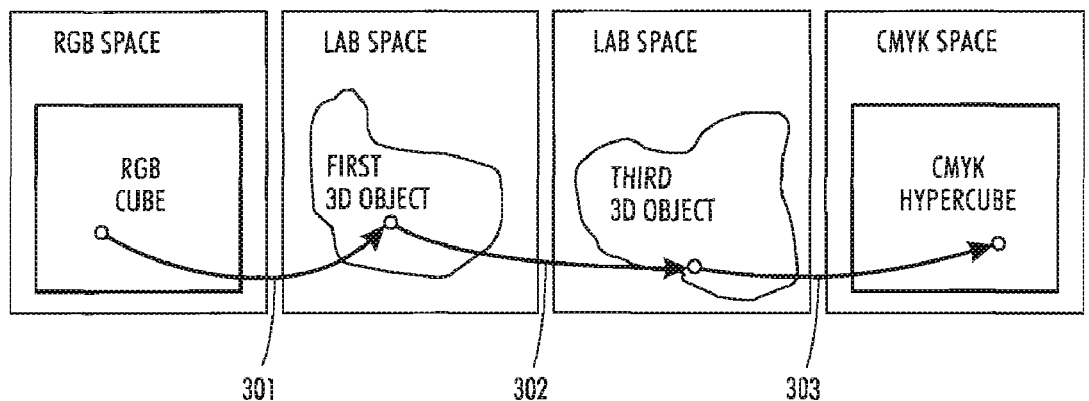
FIG. 3 shows an exemplary color image data conversion process.

In block 204, one or more lookup tables may be generated that implement the above discussed mapping of RGB image data to CMYK image data. The lookup tables convert data points of an input color image data in RGB space to data points of an output color image data in CMYK space, for example. FIG. 3 shows arrows 301-303 that correspond to the lookup tables.

Arrow 301 indicates that a data point of the input color image data in the RGB color space is converted to a corresponding data point in the first 3D object of Lab space based on the first device profile. Arrow 302 indicates that the corresponding data point in the first 3D object is converted to correspond to a point in the third 3D object. Arrow 303 indicates that the corresponding data point in the third 3D object is converted to correspond to a data point in the CMYK color space. Each of arrows 301-303 may correspond to a lookup table, and a combination of arrows 301-303 may correspond to a lookup table. Exemplary arrow combinations are shown in Table 1 below.

TABLE 1

| | Arrow Combination | Number of Lookup Tables |
|---|---|---|
| 1 | 301; 302; and 303. | 3 |
| 2 | 301; and 302-303. | 2 |
| 3 | 301-302; and 303. | 2 |
| 4 | 301-303. | 1 |

Figure 4:
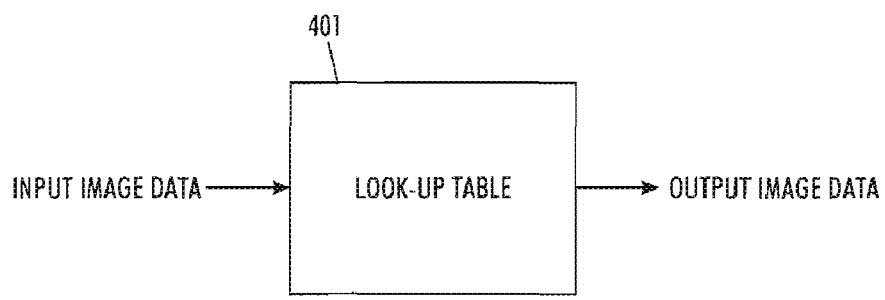
FIG. 4 shows an exemplary process flow diagram of a lookup table process.

FIG. 4 shows a simple flow diagram of arrow combination 4 where a single lookup table 401 may be used to convert input image data to output image data.

Due to practical limitations such as memory size, time, etc., the lookup tables may contain point-to-point mappings for only a certain number of points between color spaces that may be less than the total number of points within the first color space, such as the RGB color space. For example, as noted above, while the RGB color space may contain 256×256×256 (over 16 million) color points for 8 bit data, a lookup table may have considerably less points. For example, the lookup table may be 17×17×17, or contain 4913 points. The points in the lookup table may be chosen as an evenly distributed representation of the colors in RGB space, or may be chosen based on sampling the image data to be transformed and determining appropriate entries for the table from the sampling, for example.

For each input RGB point in the lookup table, a mapping may be generated to a corresponding output CMYK point using the process flow diagram of FIG. 2, for example. However, since not all points in the RGB space are included in the lookup table, interpolation, such as tetrahedral interpolation, may be performed for a point not in the lookup table. For example, if a first RGB image data point is to be mapped and is not included in the lookup table, the tetrahedron that encompasses the first RGB data point is used to obtain the corresponding CMYK values. The four RGB data points of the tetrahedron that are in the lookup table, and thus have corresponding CMYK data points mapped by the lookup table, are used for interpolation. Tetrahedral interpolation of the CMYK data points may be performed to determine the mapping of the first RGB data point in CMYK color space.

Figure 5:
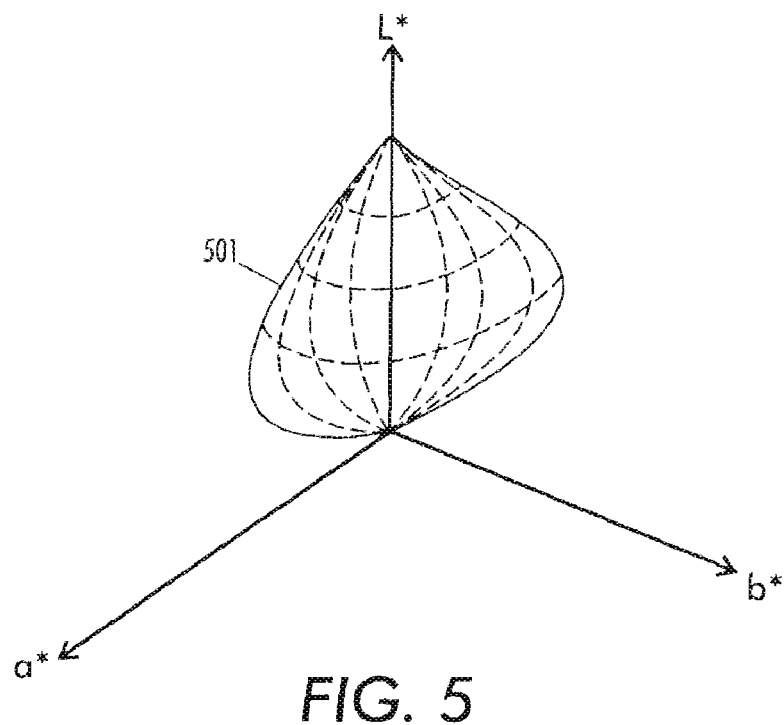
FIG. 5 shows an exemplary 3D object that may correspond to a gamut in Lab space.
Figure 6:
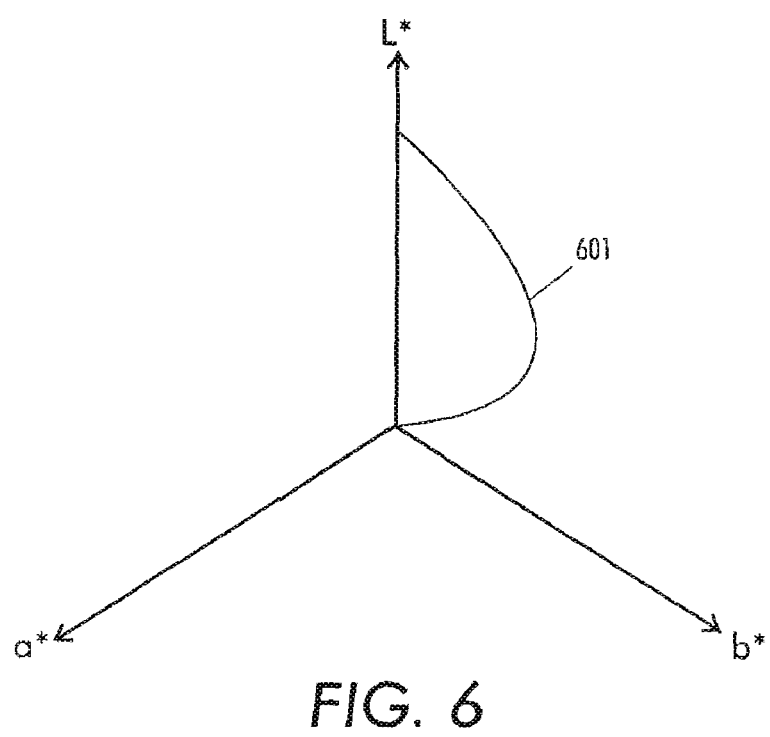
FIG. 6 shows an exemplary hue leaf in Lab space.

FIG. 5 shows an exemplary 3D object 501 in Lab space that corresponds to a device gamut. A vertical slice of 3D object 501 formed by a vertical half plane that radiates from the L* axis represents colors of a particular hue, i.e., a particular a*:b* ratio in a quadrant of Lab space which may be called a hue leaf. FIG. 6 shows an exemplary hue leaf 601 in Lab space. A hue leaf is bounded between the L* axis, and a contour formed by an intersection of the half plane radiating from the L* axis and 3D object 501.

Figure 7:
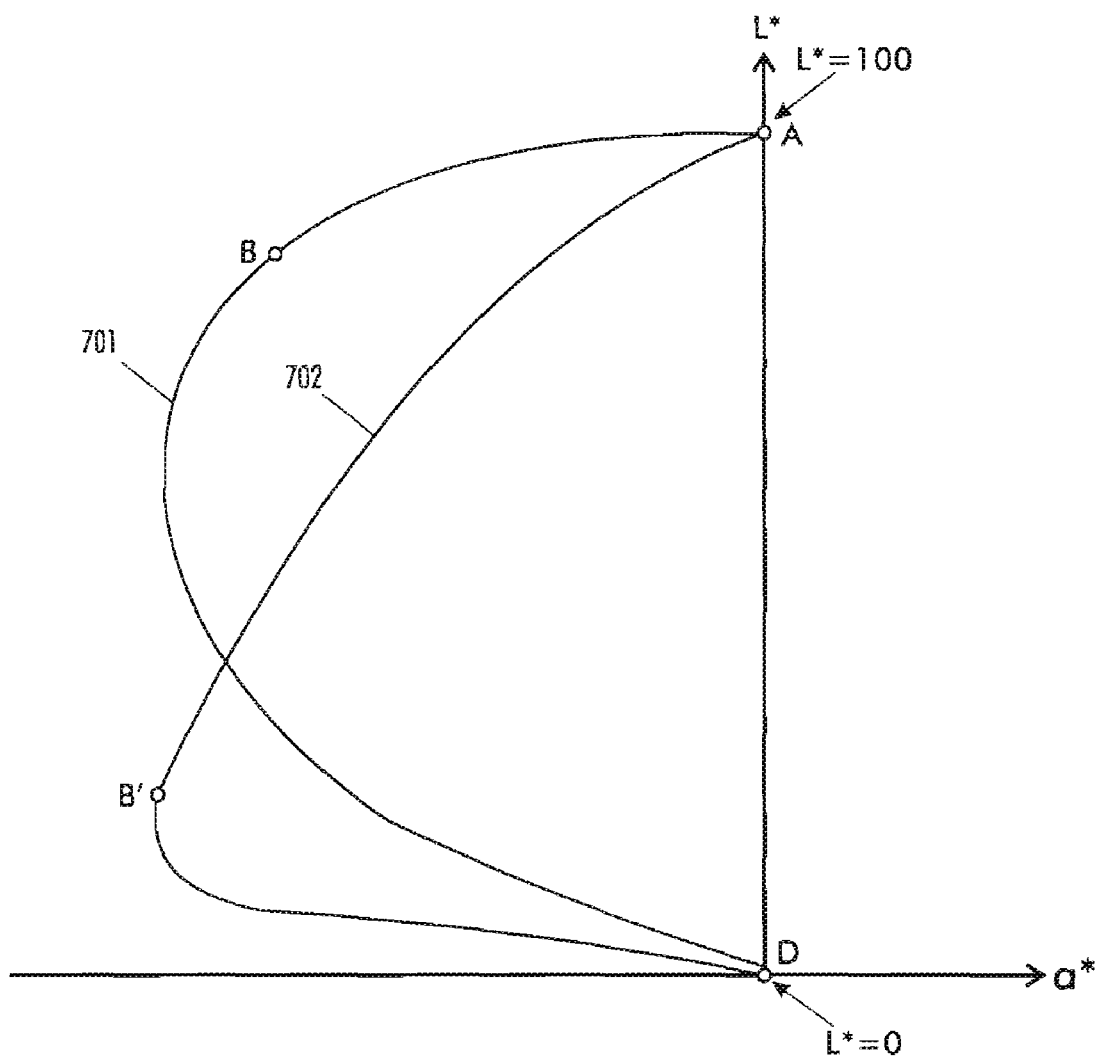
FIG. 7 shows first exemplary hue leaves that extend in the L*a* plane for two devices.

FIG. 7 shows two hue leaves 701 and 702 in Lab space, where hue leaf 701 corresponds to a gamut of a first display device such as CPU/monitor 112, and hue leaf 702 corresponds to a gamut of a second display device such as printer 121, for example. For simplicity, hue leaves 701 and 702 are selected so that $a^* \leq 0$ and $b^*=0$. Also, in Lab space, L* values are between 100 and 0 where 100 is a white point and 0 is a black point. Thus, no point on hue leaf 701 or 702 may have an L* value less than 0 or greater than 100.

Hue leaves 701 and 702 represent gamut characteristics of the first display device and the second display device, respectively, and indicate all colors that may be displayed by these two devices for a given hue. Hue leaf 701 may correspond to a CRT and hue leaf 702 may correspond to a printer, for example. The contour of hue leaf 701 extends above a contour of hue leaf 702 which may be due to the above discussed additive nature of a CRT and a subtractive nature of a printer, for example.

Figure 8:
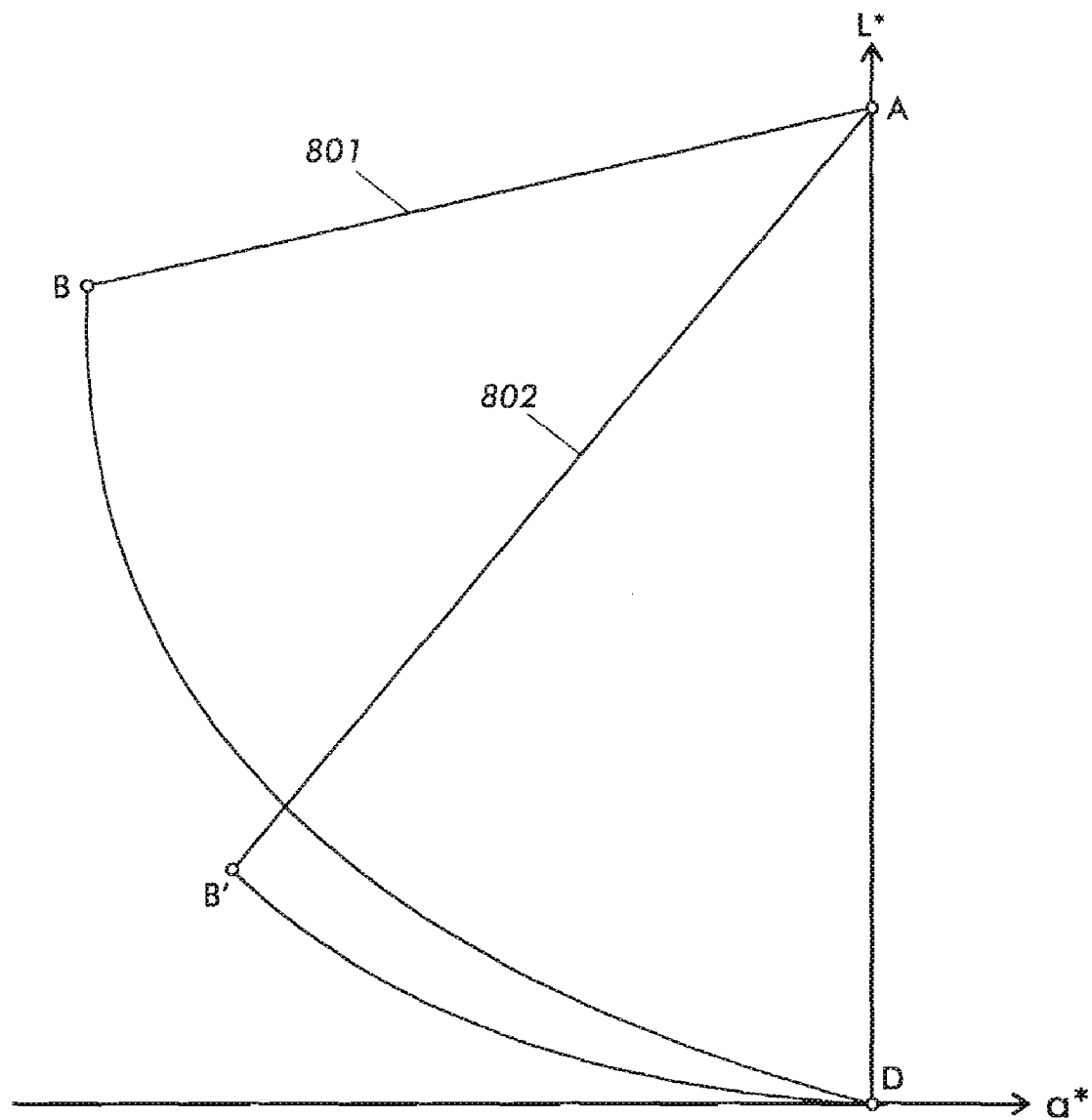
FIG. 8 shows second exemplary hue leaves that correspond to the hue leaves of FIG. 7.

For ease of discussion below, hue leaves 701 and 702 are simplified as hue leaves 801 and 802, respectively, in FIG. 8 where the contours of hue leaves 801 and 802 are simplified into straight lines AB and AB' and curved lines BD and B'D, respectively. For purposes of discussion, AB represents a straight line between points A and B, and $\overline{AB}$ represents a curved line between points A and B. Also, $\overline{ABD}$ represents a triangle bounded by AB, AD, and BD, and $\overline{ABD}$ represents a region bounded by lines AB, BD, and $\overline{BD}$.

To generate a mapping of an RGB image data point to a CMYK data point, hue leaf mapping may be used. For example, the RGB image data point to be mapped corresponds to a first Lab data point, which may be determined by the device profile, as discussed above. This first Lab data point corresponds to a first hue leaf in Lab space (i.e. it has a certain a:b ratio in a quadrant of Lab space) of the first device gamut. This first hue leaf also corresponds to a second hue leaf in Lab space of the second device gamut. The first hue leaf may be mapped to the second hue leaf to generate a mapping of the first Lab data point to the second hue leaf as a second Lab data point.

Figure 9:
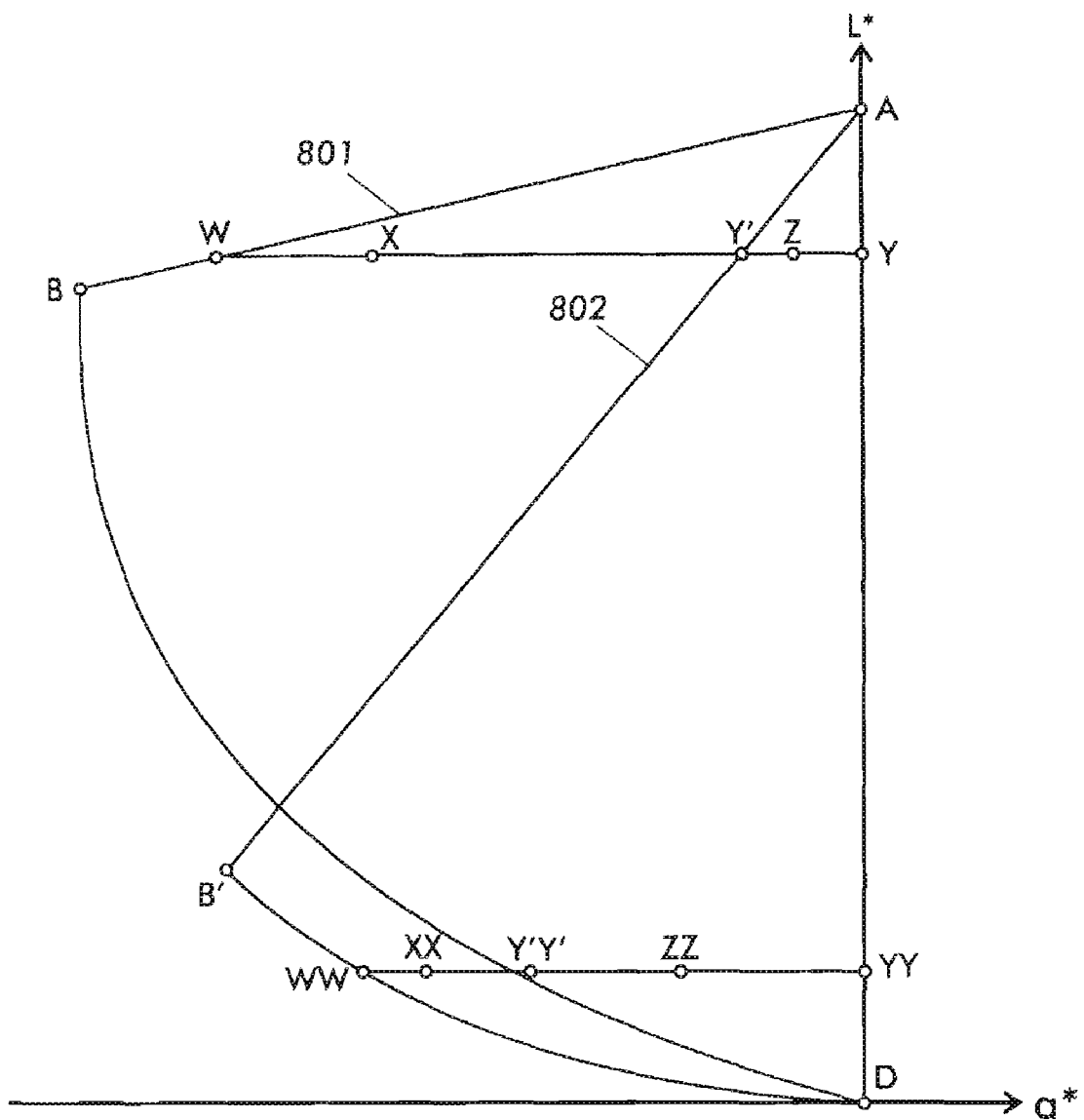
FIG. 9 shows a first exemplary hue leaf mapping method.

One technique that maps hue leaf 801 to hue leaf 802 while controlling a luminance characteristic is to map points along mapping lines such as straight lines that are parallel to the a*b* plane. For example, as shown in FIG. 9, points W, X or hue leaf 801 may be mapped to points Y' and Z of hue leaf 802 along a straight mapping line WY. Here, point W of hue leaf 801 may be mapped to point Y' of hue leaf 802, and point X of hue leaf 801 may be mapped to point Z of hue leaf 802 where a position of point Z may be determined based on a distance ratio such as:

$$L(YZ)/L(XY)=L(Y'Y)/L(WY), \quad (1)$$

where L(line) is a length of the line, and L(Y'Y)/L(WY) is a mapping ratio. This distance ratio mapping results in compressing or expanding points in hue leaf 801 into points in hue leaf 802 along portions of $\overline{BD}$ that have higher or lower luminance values than corresponding portions of B'D. Because line WY is straight and parallel to the a*b* plane, luminance values of W, X and Z are forced to be the same. The change in chrominance of image data converted between the first and second devices based on this mapping may result in a destaturated printer output that uses less ink, resulting in a lighter image. Adjusting the slope, curvature and/or spacing of the mapping lines along which hue leaf 801 is mapped into hue leaf 802 may further control luminance (and possibly other characteristics) and thus adjust a lightness of the resulting mapped image.

While the above distance ratio mapping may have controlled the printer output image relating to luminance, colors of an input image may not be desirably converted to a printed output image due to the compression and expansion process when mapping hue leaf 801 to hue leaf 802 along various mapping lines and the chrominance may be greatly reduced. Thus, to obtain a more desirable conversion from an input image to an output image, an intermediate gamut mapping may be introduced that achieves hue leaf 801 into hue leaf 802 while providing an ability to control selected characteristics such as luminance and chrominance.

Figure 10:
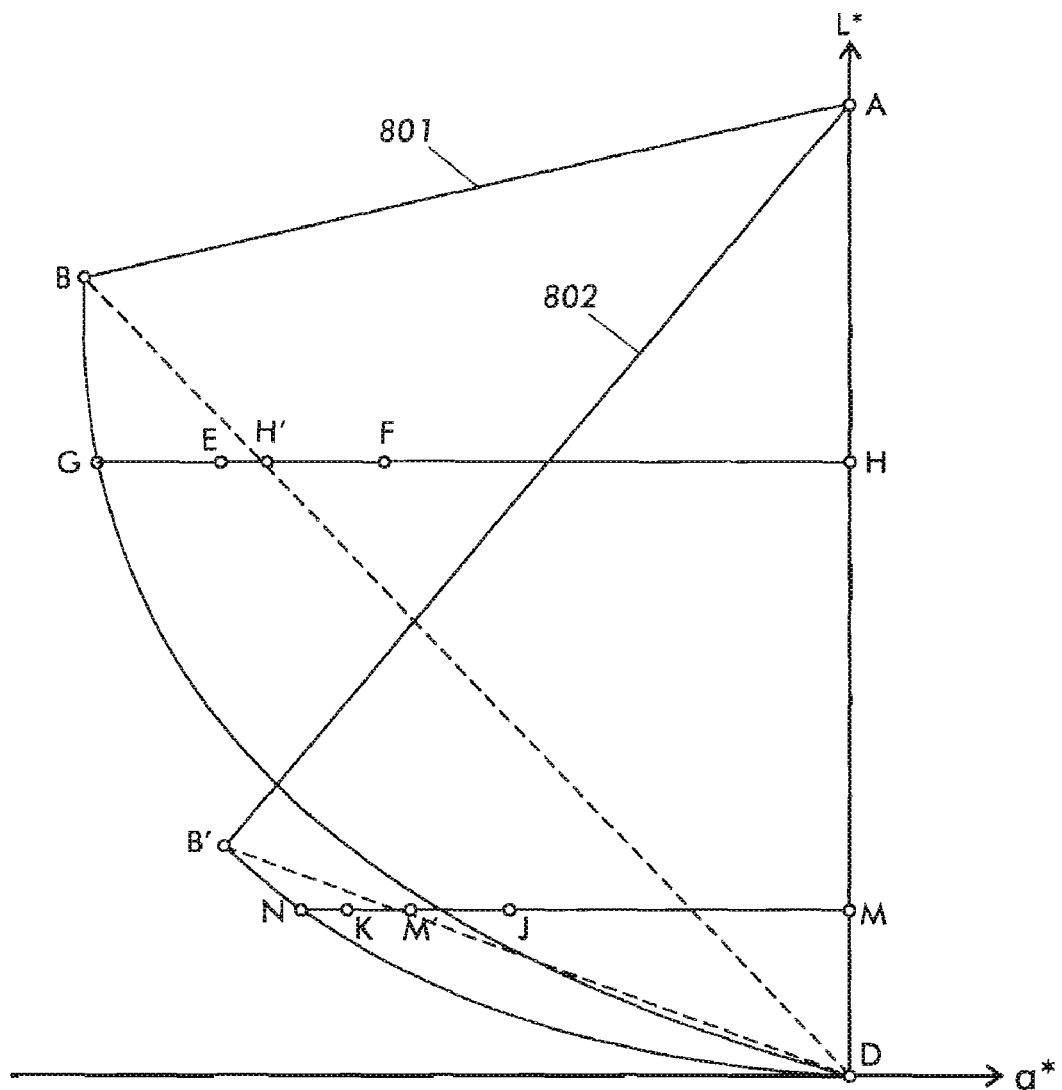
FIG. 10 shows a second exemplary hue leaf mapping method.

For example, an intermediate gamut mapping may be introduced by defining polygons within boundaries of hue leaf 801 and corresponding polygons within boundaries of hue leaf 802. A triangle example is shown in FIG. 10 where a triangle ABD is formed in hue leaf 801 and a corresponding triangle AB'D is formed in hue leaf 802. Dashed lines for BD and B'D are used for better clarity of illustration. Hue leaf 801 may be compressed into triangle ABD as hue leaf ABD using the distance ratio technique described above, hue leaf ABD may then be mapped into triangle AB'D as hue leaf AB'D, and then hue leaf AB'D may be expanded into hue leaf 802 again using the distance ratio technique.

For example, points G and E of hue leaf 801 may be mapped to points H' and F of hue leaf ABD along line GH using the distance ratio technique such that:

$$L(FH)/L(EH)=L(H'H)/L(GH). \quad (2)$$

As before, all points in hue leaf 801 may be so mapped into triangle hue leaf ABD along respective lines to control luminance. Then, triangle hue leaf ABD may be mapped into triangle hue leaf AB'D using known triangle mapping such as disclosed in U.S. Pat. No. 6,720,973 B2 which is incorporated by reference. Triangle mapping is known to be computationally efficient and preserves mapping consistency between points within the triangles.

After the triangle mapping, triangle hue leaf AB'D may be expanded to hue leaf 802 using the distance ratio technique. For example, points M' and J of triangle hue leaf AB'D may be expanded along line NM to points N and K of hue leaf 802 based on the distance ratio:

$$L(KM)/L(JM)=L(NM)/L(M'M). \quad (3)$$

Triangle mapping may be applied to non-triangular regions such as mapping ABD to AB'D by applying triangle mapping formulas for mapping ABD to AB'D to those points outside the triangles. However, such an application may cause undesirable artifacts such as negative luminance values in the mapped outputs due to the expansion in the process of mapping triangle ABD to triangle AB'D. This undesirable result may be avoided by using the distance ratio technique prior to applying triangle mapping. Thus, the distance ratio technique enables controlled mapping of luminance values and permits taking advantage of the benefits of triangle mapping without the possible undesirable artifacts.

As noted above, hue leaves 801 and 802 are simplifications of hue leaves 701 and 702 for discussion purposes. However, the discussion above in connection with hue leaves 801 and 802 may be extended to hue leaves 701 and 702 by selecting points B and B' along contours of hue leaves 701 and 702 and forming triangles ABD and AB'D. More points may be selected if other polygons are used. For triangles, points B and B' may be selected, as the points on hue leaves 701 and 702, respectively, having the greatest chrominance value.

Once points B and B' are selected, hue leaf 701 may be mapped into triangle ABD as triangle hue leaf ABD using the distance ratio technique. Here, instead of straight line AB, hue leaf 701 has AB as an upper boundary. AB can be treated in a way similar to BD so that colors above line AB are mapped inside triangle ABD. Thus, the entire hue leaf 701 is mapped to triangle ABD first. Then triangle ABD is mapped to triangle AB'D. Finally, triangle AB'D is expanded to hue leaf 702 of the printer, which includes AB' and B'D.

Figure 11:
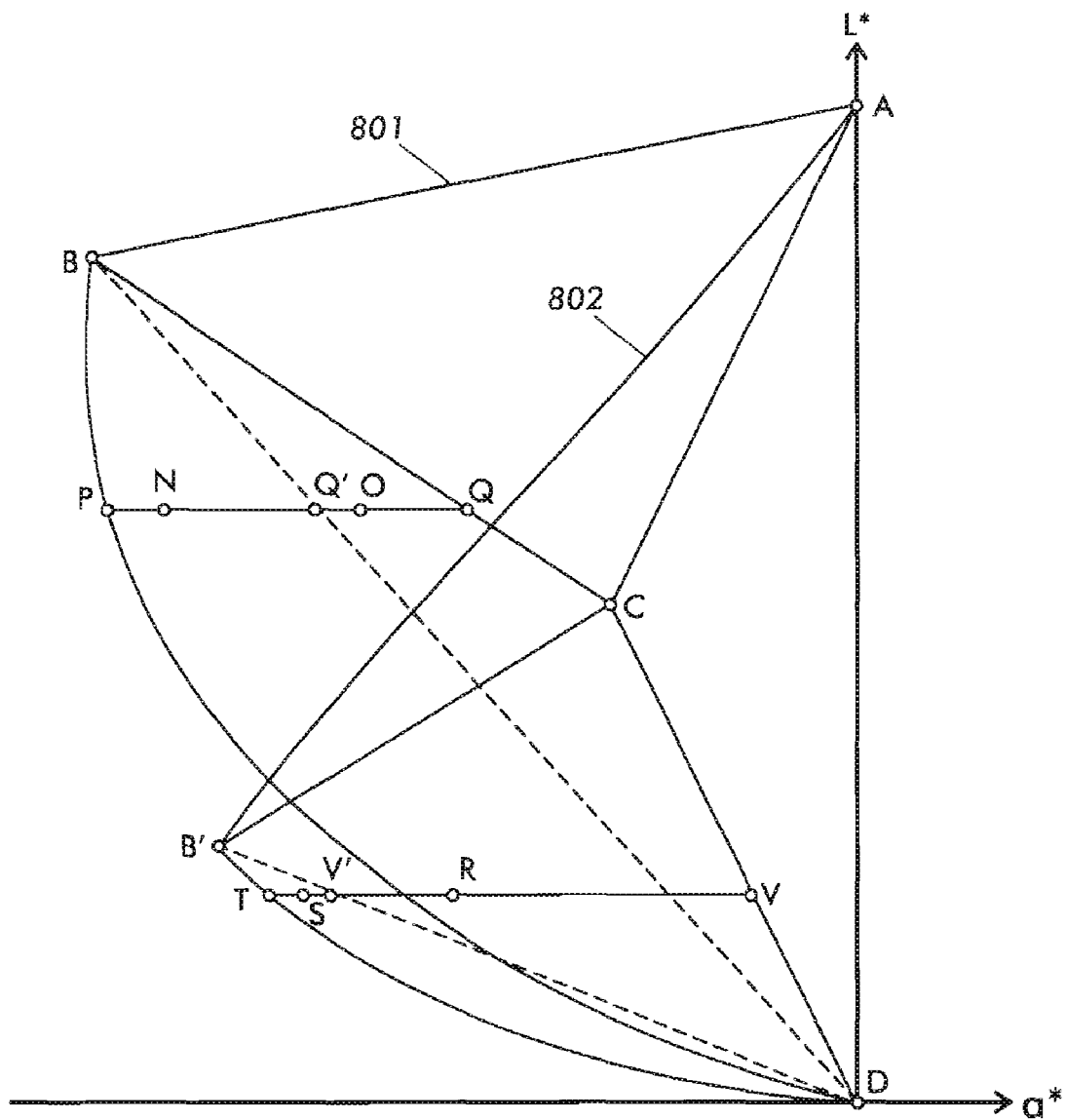
FIG. 11 shows a third exemplary hue leaf mapping method.

FIG. 11 shows a mapping with three triangles. Polygons other than triangles or a mixture of polygons may be used. In FIG. 11, triangles ACD, ABC, and BCD may be defined in hue leaf 801, and correspondingly, triangles ACD, triangle AB'C, and B'CD may be defined for hue leaf 802. Point C may be chosen so that triangle ACD includes colors such as skin tones, for example, that may not be desirable to change during mapping. Since triangle ACD is common to both hue leaf 801 and hue leaf 802, colors in triangle ACD may not need to be mapped, thereby preserving colors included in triangle ACD. Triangle ABC of hue leaf 801 may be mapped to triangle AB'C of hue leaf 802 using triangular mapping.

Region CBD may be mapped to region CB'D using a combination of the distance ratio technique and triangle mapping, as discussed above in connection with FIG. 10. First, CBD is mapped to triangle CBD using the distance ratio technique. Here, instead of the L* axis, lines BC and CD may be used as a reference for the distance ratio calculation for each mapping line. Assuming that straight mapping lines are used, then each of the mapping lines extends between BD and BC or CD. For each mapping line, the mapping ratio may be defined by the distance between BD and BC or CD divided by the distance between BD and BC or CD. After the region CBD is mapped to triangle CBD, triangle CBD may be mapped to triangle CB'D. Then, triangle CB'D may be expanded to region CB'D using the distance ratio technique discussed above in connection with CBD.

Again, while the above discussion used hue leaves 801 and 802 as examples, hue leaves 701 and 702 may be similarly mapped. In this case, ABC and CBD may be mapped into ABC and CBD, respectively, using distance ratio or other mapping techniques, and ABC and CBD may be mapped into AB'C and CB'D, respectively, using triangle mapping. AB'C may be mapped into AB'C and CB'D may be mapped into C B'D using the distance ratio mapping.

Figure 12:
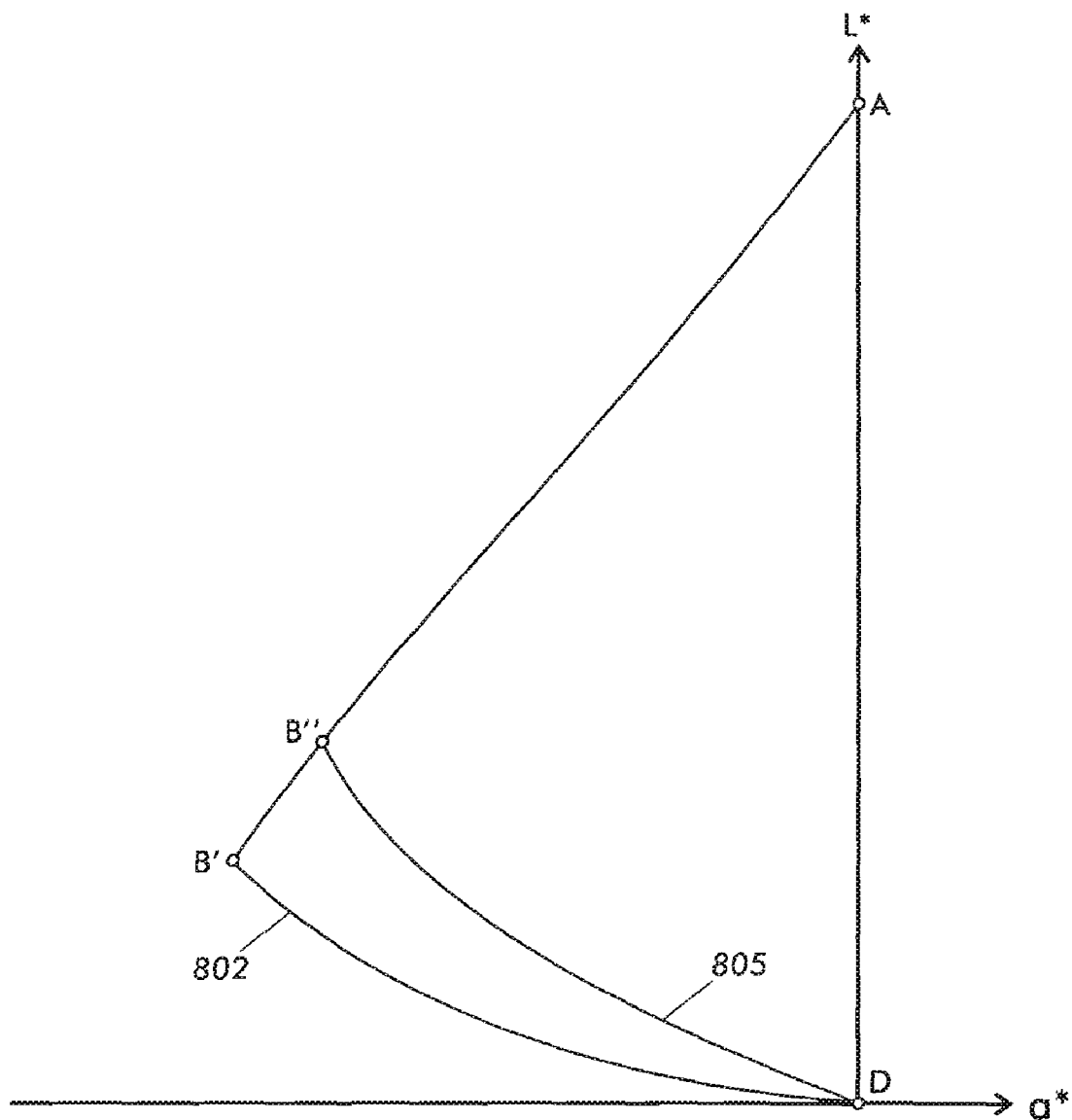
FIG. 12 shows an exemplary luminance adjustment method.

If desired, the output image may be further lightened by making an additional luminance value adjustment after the hue leaves of the first gamut such as RGB gamut are mapped into hue leaves of the second gamut such as CMYK gamut. FIG. 12 illustrates this luminance adjustment technique using hue leaves 802 and 805 as an example.

As discussed above, hue leaf 802 that is shown in FIG. 12 contains the gamut of the first device mapped into the gamut of the second device in Lab space. Luminance values of hue leaf 802 may be increased by compressing hue leaf 802 into hue leaf 805 whose lower luminance boundary B"D has greater luminance values than the lower boundary B'D of hue leaf 802. Stated differently, a point B" along AB' may be chosen such that L(AB')>L(AB"). Region AB'D may be mapped using triangular mapping by deriving triangular mapping formulas for mapping AB'D to AB"D and applying those formulas to data points in region AB'D. This procedure will not result in undesirable artifacts because of a triangular mapping property relating to mapping to region AB"D that is encompassed by region AB'D.

Figure 13:
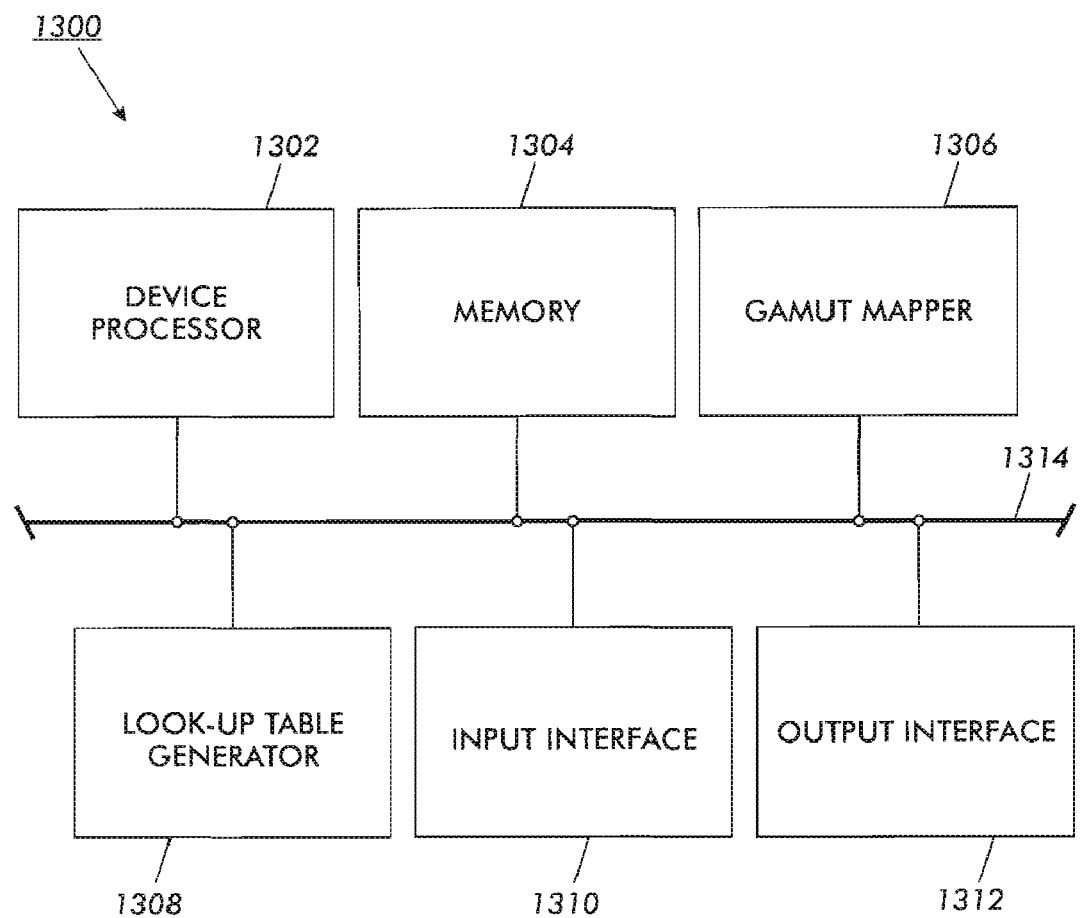
FIG. 13 shows an exemplary block diagram of a controller.

FIG. 13 shows an exemplary block diagram of controller 1300 for a device such as CPU/monitor 111 or printer 121. Controller 1300 may include a device processor 1302, a memory 1304, a gamut mapper 1306, a lookup table generator 1308, an input interface 1310 and an output interface 1312. The above components may be coupled together by bus 1314. While, as an example, controller 1300 is illustrated using a bus architecture, any other type of convenient architecture may be used. Additionally, components 1302 and 1306-1312 may be implemented using any of a variety of technologies such as PLI, PAL, application specific integrated circuits (ASICs), off the shelf components, etc. Device processor 1302, gamut mapper 1306 and lookup table generator 1308 may be implemented in hardware by a general purpose processor or a special purpose processor or may be implemented by software in one or more processors. Memory 1304 may be hard disk, RAM, ROM, flash memories, bubble memories, etc. Input and output interfaces 1310 and 1312, respectively, may be any type of interface such as network interfaces using wired, wireless, optical, etc. technologies, internal device interfaces, etc. These interfaces may implement standard protocols such as TCP/IP, USB, IEEE 1394, etc.

Controller 1300 may be a controller for a workstation, a server, a router, a personal computer (PC) or image processing devices such as video cards, xerographic or ink jet devices, scanners, or multifunctional devices, for example. In the PC example, usually the monitor is controlled by a video card and the controller of the video card may correspond to controller 1300. In the server or router example, when color image data is received, commands may be embedded in the received data in the header area, for example, that instruct a server or router to perform image conversion such as discussed above. Thus, when such color image data and commands are received, the server or router may execute the commands so that the color image data received at an image output device may be output immediately without further conversion.

Other conversion scenarios may be possible. For example, the complete conversion from input color image data to output color image data may be performed immediately by a PC used by a user that originated the image data. For example, when a user issues a command to output an image displayed on a display device such as a CRT or LCD panel of a PC or workstation, the PC may act as controller 1300 and perform the image conversion processes discussed above and output the converted image data to an output device such as a printer for immediate printing.

The conversion process may be divided into parts corresponding to arrow combinations shown in FIG. 3, for example. Any device along the path between the user and the output image may perform one or more portions of the conversion. In the following discussion in connection with FIG. 13, a single complete conversion process performed by controller 1300 is described as an example.

When controller 1300 receives input color image data through interface 1310, device processor 1302 examines the input color image data for any instruction for processing the received input color image data. If controller 1300 is a workstation, for example, the input interface may simply be an SCSI internal bus interface, which receives data from a video card. The instruction may be a software command to convert the color image data from the video card into an output color image data for outputting through another device such as a printer.

If the command indicates that no data conversion is required, device processor 1302 outputs the input color image data to a designated location through output interface 1312. However, if data conversion is required, device processor 1302 determines whether one or more lookup tables are available in memory 1304 for performing this data conversion. For example, the received input data may indicate the identification of the input image display device and the identification of an output device to which the input color image data should be converted. The input and output device identifications may directly identify the lookup tables without reference to the devices. If the one or more lookup tables are available either locally or on other platforms, device processor 1302 retrieves the lookup tables and performs the data conversion to generate an output color image data. The output color image data may then be output to the output device via output interface 1312.

If the lookup tables are not available in memory 1304, for example, and the lookup tables need to be generated on-the-fly, device processor 1302 may then determine whether device profiles and/or gamuts (collectively mapping data) for the input and output devices were included in the received input data. If not included, device processor 1302 may again search memory 1304 to determine whether the mapping data for the input and output devices have been stored. If not found, device processor 1302 may obtain the mapping data from external sources by sending out a request for such mapping data through output interface 1312. When the mapping data is received, device processor 1302 may send the mapping data to gamut mapper 1306 for mapping the gamut of the input device to the gamut of the output device to generate the lookup table.

As noted above, while ideally the complete first color device space, which may be, for example, the RGB cube, is mapped into the second color device space, which may be, for example, the CMYK hypercube, such a procedure is very demanding on processor resources and for any particular input image data, such a complete mapping may be unnecessary. Thus, gamut mapper 1306 may obtain a 17×17×17 cube sample (4913 sample data points), map this RGB sample cube into a corresponding CMYK hypercube, generate a lookup table, and map the input image data using an objective space, such as Lab space, based on the generated lookup table performing interpolations as may be necessary.

For each of the 4913 sampled data points, gamut mapper 1306 may find the Lab space data point of the first gamut that corresponds to the sampled data point. The Lab space data point may be mapped to a corresponding Lab space data point of the second gamut based on the various hue leaf mappings described above. Then a corresponding data point in CMYK space may be obtained for the Lab space data point of the second gamut. The correspondence thus obtained maps a single point in the sampled RGB space into a single data point in CMYK space. This procedure may be performed for all 4913 data points resulting in a lookup table for mapping 4913 data points in RGB space into 4913 data points in CMYK space for the first and second devices corresponding to the first and second gamuts.

The generated lookup table may be stored in memory 1304 for future use or device processor 1302 may use the generated lookup table to convert the input color image data into the output color image data and then discard the generated lookup table to save memory. The generated output color image data is then output to the output device via output interface 1312.

Figure 14:
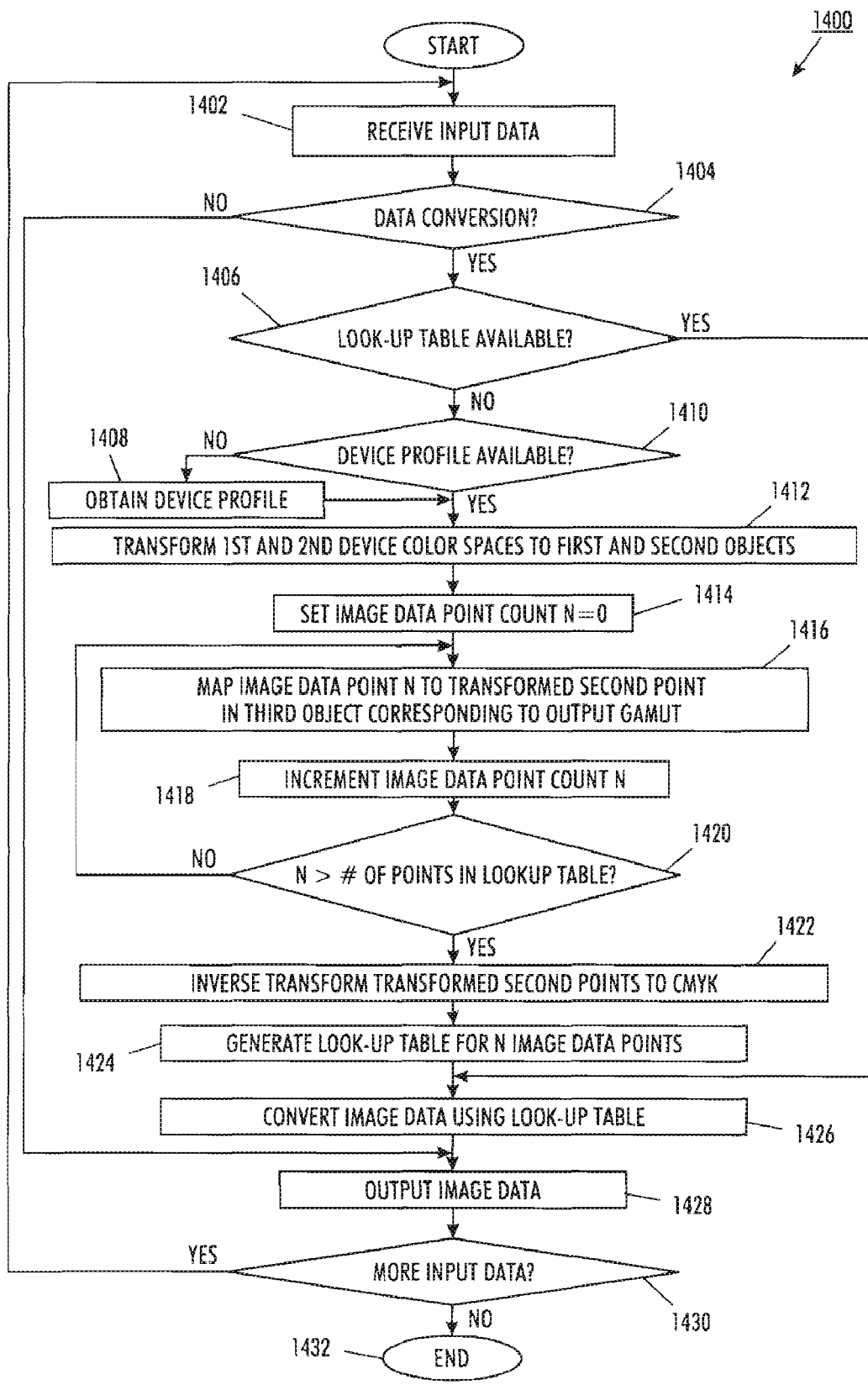
FIG. 14 shows an exemplary flowchart for a device that maps color image data from one device to output color image data for another device.

FIG. 14 shows an exemplary process 1400 performed by a device controller. In step 1402, the process receives input image data and goes to step 1404. As noted above, the input image data may include identifications of input and output devices or input and output device profiles. In step 1404, the process determines whether instructions are included in the input image data to indicate whether data conversion is required. If required, the process goes to step 1406; otherwise, the process goes to step 1428 and outputs the image data to the output device. The process may not require instructions in the input image data if the conversion is always required.

In step 1406, the process determines if one or more lookup tables are available for the identified input and output devices. If available, the process goes to step 1426 and converts the input image data into the output image data using the lookup table; otherwise, the process goes to step 1410. In step 1410, the process determines whether device profile data corresponding to the first and second devices are available. If available, the process goes to step 1412; otherwise, the process goes to step 1408. In step 1408, the process obtains device profile data from either local memory such as memory 1304 for device controller 1300 or from other sources accessible by the process. Then the process goes to step 1412. In step 1412, the process uses the first device profile to transform the first color device space, which may be RGB color space, for example, to a first object in an objective mapping space, such as CIE L*a*b*, that is selected for controlling a particular one or more characteristics. Also in step 1412, using the second device profile, the processor transforms the second color device space, which may be CMYK color space, for example, to a second object in the mapping space. As mentioned earlier, if the device profile does not have high enough resolution to include all of the image data points, interpolation such as tri-linear or tetrahedral interpolation may be used. Then the process goes to step 1414.

In step 1414, the process acquires the image data points to be included in the lookup table and sets the image data point count N=0. As discussed earlier, these points may be chosen to be a distributed sampling of the entire first color device space or may be chosen based on the image data, for example. The process goes to step 1416.

In step 1416, the process maps an image data point included in the lookup table to a second point in the second object resulting in a transformed second point in a third object, which is a result of mapping points of the first object to points of the second object. For example, from step 1412, the transformed first point in the first object corresponding to the RGB image data point is known.

The transformed first point may be mapped to the transformed second point in the second object using the mapping technique shown in FIG. 11. The transformed first point is located on a hue leaf, and a corresponding hue leaf may be chosen in the second object. Then, the transformed first point may be mapped to the second point to generate a transformed second point, as discussed in regards to FIG. 11, for example. The process goes to step 1418.

At step 1418, the input data point counter is incremented, and the process goes to step 1420. At step 1420, the process determines whether the image data counter is greater than the number of data points in the lookup table. If greater than the number of data points, the process goes to step 1422; otherwise, the process returns to step 1416.

In step 1422, the process transforms all of the transformed second points in the resulting third object to the second color device space using an inverse of the transform generated in step 1412 for the second device and goes to step 1424. In step 1424, the process generates a lookup table based on the mappings from the input image data points to the output image data points, and goes to step 1426. In step 1426, the process converts the input image data into output image data using the lookup table. As noted above, interpolation may be required such as tetrahedral interpolation because the mapping process may not have enough resolution to include all the points in the image data. Thus, step 1426 may also perform the interpolation process while converting the input image data into the output image data. Then the process goes to step 1428. In step 1428, the process outputs the converted image data to the output device and goes to step 1430. In step 1430, the process determines whether more input data need conversion. If more input data need conversion, the process returns to step 1402; otherwise, the process goes to step 1432 and ends.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those killed in the art which are also intended to be encompassed by the following claims.

What is claimed is:

1. A method for converting color image data comprising: using a processor to perform the steps of:
   identifying a first color device space, a second color device space, and an objective color space;
   selecting data points from the first color device space as a first subspace;
   selecting data points from the second color device space as a second subspace;
   generating a first amut based on the first subspace and a first device profile;
   generating a second gamut based on the second subspace and a second device profile;
   for each data point in the first subspace:
      determining a first gamut data point in the first gamut that corresponds to the each data point in the first subspace to generate a first mapping;
      determining a second gamut data point in the second gamut that corresponds to the first gamut data point based on a first hue leaf of the first gamut that contains the first gamut data point a second hue leaf of the second gamut that corresponds to the hue leaf of the first gamut, one or more polygons and one or more distance ratios to generate a second mapping; and
      determining a data point in the second color device space based on the second gamut data point and the second device profile to generate a third mapping; and
   mapping the first gamut in the objective color space corresponding to the first color device space into the second gamut in the objective color space corresponding to the second color device space based on the polygons and the distance ratios to generate a mapped first gamut, wherein the mapped first gamut is capable of being used for converting the color image data into output color image data, wherein the first hue leaf includes two straight outside edges and a separate single curved outside edge, the curved outside edge including two separate end points; and
   the generating of the second gamut step includes mapping one of the end points of the curved outside edge of the first hue leaf to a different location on one of the straight outside edges.

2. The method of claim 1, further comprising:
   selecting luminance as a characteristic of the color image data;
   selecting an Lab color space as the objective color space based on the characteristic; and
   adjusting the second mapping to increase a lowest luminance boundary in the second hue leaf to have greater luminance values.

3. The method of claim 1, wherein the polygons are triangles.

4. The method of claim 1, further comprising:
   interpolating among data points in the first device profile to obtain the first gamut data point based on the data point in the first subspace.

5. The method of claim 1, further comprising:
   generating a first lookup table based on the first mapping;
   generating a second lookup table based on the second mapping; and
   generating a third lookup table based on the third mapping.

6. The method of claim 5, further comprising:
   converting the color image data into the output color image data by one of:
      a. first partially converting the color image data based on the first lookup table to generate a first partial conversion result and sending the first partial conversion result elsewhere for completing the converting;
      b. receiving the first partial conversion result, second partially converting the color image data based on the second lookup table to generate a second partial conversion result, and sending the second partial conversion result elsewhere for completing the converting;
      c. receiving the second partial conversion result and completing the converting by generating the output color image data based on the third lookup table;

d. third partially converting the color image data based on a fourth lookup table that is an equivalent of the first and second lookup tables to generate a third partial conversion result and sending the third partial conversion result elsewhere for completing the converting;

e. receiving the first partial conversion result, and completing the converting by generating the output color image data based on a fifth lookup table that is an equivalent of the second and third lookup tables; and f. converting the image data into the output color image data based on a sixth lookup table that is an equivalent of the first, second and third lookup tables.

7. The method of claim 6, further comprising:
obtaining at least one of the first, second, third, fourth, fifth and sixth lookup tables by one of:
retrieving from a memory;
receiving from a communication unit; and
generating on-the-fly.

8. The method of claim 6, further comprising:
performing an interpolation process when generating the first, second, and third partial conversion results and completing the converting, wherein the interpolation process performs an interpolation using a number of data points based on a dimension in which the first, second, and third partial conversion results and the output color image data are expressed.

9. A non-transitory computer readable medium storing a computer program, the computer program:
identifying a first color device space, a second color device space, and an objective color space;
selecting data points from the first color device space as a first subspace:
selecting data points from the second color device space as a second subspace;
generating a first gamut based on the first subspace and a first device profile;
generating a second gamut based on the second subspace and a second device profile;
determining a first gamut data point in the first gamut that corresponds to a data point in the first subspace to generate a first mapping;
determining a second gamut data point in the second gamut that corresponds to the first gamut data point based on a first hue leaf of the first gamut that contains the first gamut data point, a second hue leaf of the second gamut that corresponds to the hue leaf of the first gamut, one or more polygons and one or more distance ratios to generate a second mapping; and
determining a data point in the second color space based on the second gamut data point and the second device profile to generate a third mapping; and
mapping the first gamut in the objective color space corresponding to the first color device space into the second gamut in the objective color space corresponding to the second color device space based on the polygons and the distance ratios to generate a mapped first gamut, wherein the mapped first gamut is capable of being used for converting the color image data into output color image data, wherein the first hue leaf includes two straight outside edges and a separate single curved outside edge, the curved outside edge including two separate end points and
the generating of the second gamut step includes mapping one of the end points of the curved outside edge of the first hue leaf to a different location on one of the straight outside edges.

10. The non-transitory computer readable medium of claim 9, wherein the computer program includes:
selecting luminance as a characteristic of the color image data;
selecting an Lab color space as the objective color space based on the characteristic; and
adjusting the second mapping to increase a lowest luminance boundary in the second hue leaf to have greater luminance values.

11. The non-transitory computer readable medium of claim 9, wherein the polygons are triangles.

12. The non-transitory computer readable medium of of claim 9, wherein the computer program includes:
interpolating among data points in the first device profile to obtain the first gamut data point based on the data point in the first subspace;
generating a first lookup table based on the first mapping;
generating a second lookup table based on the second mapping;
generating a third lookup table based on the third mapping;
converting the color image data into the output color image data by one of:
a. first partially converting the color image data based on the first lookup table to generate a first partial conversion result and sending the first partial conversion result elsewhere for completing the converting;
b. receiving the first partial conversion result, second partially converting the color image data based on the second lookup table to generate a second partial conversion result, and sending the second partial conversion result elsewhere for completing the converting;
c. receiving the second partial conversion result and completing the converting by generating the output color image data based on the third lookup table;
d. third partially converting the color image data based on a fourth lookup table that is an equivalent of the first and second lookup tables to generate a third partial conversion result and sending the third partial conversion result elsewhere for completing the converting;
e. receiving the first partial conversion result, and completing the converting by generating the output color image data based on a fifth lookup table that is an equivalent of the second and third lookup tables; and
f. converting the image data into the output color image data based on a sixth lookup table that is an equivalent of the first, second and third lookup tables; and
obtaining at least one of the first, second, third, fourth, fifth and sixth lookup tables by one of:
retrieving from a memory;
receiving from a communication unit; and
generating on-the-fly.

13. An apparatus for converting color image data comprising:
an output color image data; and
a controller, wherein the controller:
identifies a first color device space, a second color device space, and an objective color space;
selects data points from the first color device space as a first subspace;
selects data points from the second color device space as a second subspace;
generates the first gamut based on the first subspace and a first device profile;
generates the second gamut based on the second subspace and a second device profile;

determines a first gamut data point in the first gamut that corresponds to a data point in the first subspace to generate a first mapping;

determines a second gamut data point in the second gamut that corresponds to the first gamut data point based on a first hue leaf of the first gamut that contains the first gamut data point, a second hue leaf of the second gamut that corresponds to the hue leaf of the first gamut, one or more polygons and one or more distance ratios to generate a second mapping;

determines a data point in the second color device space based on the second gamut data point and the second device profile to generate a third mapping;

generates a first lookup table based on the first mapping;

generates a second lookup table based on the second mapping generates a third lookup table based on the third mapping;

converts the color image data into the output color image data by one of:

a. first partially converting the color image data based on the first lookup table to generate a first partial conversion result and sending the first partial conversion result elsewhere for completing the converting:

b. receiving the first partial conversion result, second partially converting the color image data based on the second lookup table to generate a second partial conversion result, and sending the second partial conversion result elsewhere for completing the converting;

c. receiving the second partial conversion result and completing the converting by generating the output color image data based on the third lookup table;

d. third partially converting the color image data based on a fourth lookup table that is an equivalent of the first and second lookup tables to generate a third partial conversion result and sending the third partial conversion result elsewhere for completing the converting;

e. receiving the first partial conversion result, and completing the converting by generating the output color image data based on a fifth lookup table that is an equivalent of the second and third lookup tables; and f. converting the image data into the output color image data based on a sixth lookup table that is an equivalent of the first second and third lookup tables; and obtains at least one of the first second third fourth fifth and sixth lookup tables by one of:

retrieving from a memory;

receiving from a communication unit; and generating on-the-fly; and maps the first gamut in the objective color space corresponding to the first color device space into the second gamut in the objective color space corresponding to the second color device space based on the polygons and the distance ratios to generate a mapped first gamut, wherein the mapped first gamut is capable of being used for converting the color image data into output color image data, wherein the first hue leaf includes two straight outside edges and a separate single curved outside edge, the curved outside edge including two separate end points; and the generating of the second gamut step includes mapping one of the end points of the curved outside edge of the first hue leaf to a different location on one of the straight outside edges.

14. A xerographic or inkjet device that includes the apparatus of claim 13.

15. The apparatus of claim 13, wherein the controller further performs:

identifying a first color device space, a second color device space, and an objective color space; and mapping a first gamut in the objective color space corresponding to the first color device space into a second gamut in the objective color space corresponding to the second color device space based on one or more polygons and distance ratios to generate a mapped first gamut, wherein the mapped first gamut is capable of being used for converting the color image data into output color image data.

16. The apparatus of claim 15, wherein the controller further performs:

selecting data points from the first color device space as a first subspace;

selecting data points from the second color device space as a second subspace;

generating the first gamut based on the first subspace and a first device profile;

generating the second gamut based on the second subspace and a second device profile;

determining a first gamut data point in the first gamut that corresponds to the data point in the first subspace to generate a first mapping;

determining a second gamut data point in the second gamut that corresponds to the first gamut data point based on a first hue leaf of the first gamut that contains the first gamut data point, a second hue leaf of the second gamut that corresponds to the hue leaf of the first gamut, the polygons and the distance ratios to generate a second mapping;

determining a data point in the second color space based on the second gamut data point and the second device profile to generate a third mapping;

generating a first lookup table based on the first mapping;

generating a second lookup table based on the second mapping; and generating a third lookup table based on the third mapping.

* * * * *